(12) United States Patent
Wang et al.

(10) Patent No.: US 10,970,856 B2
(45) Date of Patent: Apr. 6, 2021

(54) JOINT LEARNING OF GEOMETRY AND MOTION WITH THREE-DIMENSIONAL HOLISTIC UNDERSTANDING

(71) Applicant: Baidu USA, LLC, Sunnyvale, CA (US)

(72) Inventors: Peng Wang, Sunnyvale, CA (US); Chenxu Luo, Baltimore, MD (US); Yang Wang, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 131 days.

(21) Appl. No.: 16/233,622

(22) Filed: Dec. 27, 2018

(65) Prior Publication Data

US 2020/0211206 A1 Jul. 2, 2020

(51) Int. Cl.

| | |
|---|---|
| *G06T 7/254* | (2017.01) |
| *G06T 7/579* | (2017.01) |
| *G06K 9/74* | (2006.01) |
| *G06N 3/08* | (2006.01) |
| *G06N 20/00* | (2019.01) |
| *G06T 7/62* | (2017.01) |

(52) U.S. Cl.
CPC .............. *G06T 7/254* (2017.01); *G06K 9/748* (2013.01); *G06N 3/08* (2013.01); *G06N 20/00* (2019.01); *G06T 7/579* (2017.01); *G06T 7/62* (2017.01); *G06T 2207/20081* (2013.01)

(58) Field of Classification Search
CPC ........... G06T 7/62; G06T 7/254; G06T 7/579; G06T 2207/20081; G06N 3/08; G06K 9/748
USPC .................................................. 382/107, 154
See application file for complete search history.

(56) References Cited

U.S. PATENT DOCUMENTS

| | | | | |
|---|---|---|---|---|
| 2014/0355820 A1* | 12/2014 | Wu | ........................... | G06T 7/75 382/103 |
| 2019/0057509 A1* | 2/2019 | Lv | ........................ | G06N 3/0454 |

OTHER PUBLICATIONS

Newcombe et al.,"DTAM: dense tracking and mapping in real-time," in ICCV, [online], [Retrieved Dec. 4, 2019]. Retrieved from Internet <URL: https://ieeexplore.ieee.org/abstract/document/6126513>, 2011. (2pgs).

(Continued)

*Primary Examiner* — Daniel G Mariam
(74) *Attorney, Agent, or Firm* — North Weber & Baugh LLP

(57) ABSTRACT

Described herein are systems and methods for jointly learning geometry and motion with three-dimensional holistic understanding. In embodiments, such approaches enforce the inherent geometrical consistency during the learning process, yielding improved results for both tasks. In embodiments, three parallel networks are adopted to predict the camera motion (e.g., MotionNet), dense depth map (e.g., DepthNet), and per-pixel optical flow between consecutive frames (e.g., FlowNet), respectively. The information of 2D flow, camera pose, and depth maps, are fed into a holistic 3D motion parser (HMP) to disentangle and recover per-pixel 3D motion of both rigid background and moving objects. Various loss terms are formulated to jointly supervise the three networks. Embodiments of an efficient iterative training strategy are disclosed for better performance and more efficient convergence. Performance on depth estimation, optical flow estimation, odometry, moving object segmentation, and scene flow estimation demonstrates the effectiveness of the disclosed systems and methods.

19 Claims, 7 Drawing Sheets

(56) References Cited

OTHER PUBLICATIONS

Tsai et al.,"Video segmentation via object flow," in IEEE, [online], [Retrieved Dec. 4, 2019]. Retrieved from Internet <URL: https://ieeexplore.ieee.org/document/7780792>, 2016. (2pgs).
Yang et al.,"Spatio-temporal action detection with cascade proposal and location anticipation," arXiv preprint arXiv:1708.00042, 2017. (12 pgs).
Menze et al.,"Object scene flow for autonomous vehicles," in IEEE, [online], [Retrieved Dec. 4, 2019]. Retrieved from Internet <URL: https://ieeexplore.ieee.org/document/7298925>, 2015. ( 2pgs).
DeSouza et al.,"Vision for mobile robot navigation: A survey," IEEE transactions on pattern analysis and machine intelligence, vol. 24, No. 2, 2002. (31 pgs).
Yang et al.,"Lego: Learning edge with geometry all at once by watching videos," arXiv:1803.05648, 2018. (13 pgs).
Wang et al.,"Occlusion aware unsupervised learning of optical flow," arXiv preprint arXiv:1711.05890, 2018 (10pgs).
Yang et al.,"Every pixel counts:Unsupervised geometry learning with holistic 3D motion understanding," arXiv preprint arXiv:1806.10556, 2018.(17pgs).
Godard et al.,"Unsupervised monocular depth estimation with left-right consistency," arXiv preprint arXiv:1609.03677, 2017. (14 pgs).
Zhou et al,"Unsupervised learning of depth and ego-motion from video," in CVPR, 2017. (10pgs).
Yang et al,"Unsupervised learning of geometry from videos with edge-aware depth-normal consistency," in AAAI, 2018. (8pgs).
Eigen et al.,"Depth map prediction from a single image using a multi-scale deep network," in NIPS, 2014. (9pgs).
Wu et al., "Visualsfm: A visual structure from motion system," [online], [Retrieved Mar. 21, 2020]. Retrieved from Internet <URL:http://ccwu.me/vsfm/doc.html> 2011 (10pgs).
Vijayanarasimhan et al.,"Sfm-net: Learning of structure and motion from video," arXiv preprint arXiv:1704.07804, 2017. (9pgs).
Horn et al.,"Determining optical flow," Artificial intelligence, vol. 17, No. 1-3, pp. 185-203, 1981. (19pgs).
Jason et al.,"Back to basics: Unsupervised learning of optical flow via brightness constancy and motion smoothness," arXiv preprint arXiv:1608.05842, 2016. (4pgs).
Ren et al.,"Unsupervised deep learning for optical flow estimation," in AAAI, pp. 1495-1501, 2017. (7 pgs).
Mur-Artal et al.,"ORB-SLAM: a Versatile and AccurateMonocular SLAM System," arXiv preprint arXiv:1502.00956, 2015. (18 pgs).
Engel et al.,"LSD-SLAM: Large-Scale Direct Monocular SLAM," in ECCV, 2014. (16pgs).
Dai et al.,"A simple prior-free method for non-rigid structure-from-motion factorization," [online], [Retrieved Mar. 21, 2020]. Retrieved from Internet <URL: http://users.cecs.anu.edu.au/~hongdong/CVPR12_Nonrigid_CRC_17_postprint.pdf>, 2012.(9 pgs).
Taylor et al.,"Non-rigid structure from locally-rigid motion," [online], [Retrieved Mar. 21, 2020]. Retrieved from Internet <URL: http://www.cs.toronto.edu/~jtaylor/papers/phd-thesis.pdf> 2014. (12pgs).
Kumar et al.,"Monocular dense 3d reconstruction of a complex dynamic scene from two perspective frames," ICCV, 2017. (9pgs).
Kumar et al.,"Multi-body non-rigid structure-from-motion," arXiv preprint arXiv:1607.04515 2016. (21pgs).
Hoiem et al.,"Recovering surface layout from an image," in ICCV, 2007.(23pgs).
Prados et al.,"Shape from shading,"Handbook of mathematical models in computer vision, pp. 375-388, 2006.(18pgs).
Kong et al.,"Intrinsic depth: Improving depth transfer with intrinsic images," in ICCV, 2015. (9 pgs).
Schwing et al.,"Box in the box:Joint 3d layout and object reasoning from single images," in ICCV, 2013. (8pgs).
Srajer et al.,"MatchBox: Indoor image matching via box-like scene estimation," in 3DV, 2014. (8pgs).
Wang et al.,"Designing deep networks for surface normal estimation," in CVPR, 2015. (9pgs).
Eigen et al.,"Predicting depth, surface normals and semantic labels with a common multi-scale convolutional architecture," arXiv preprint arXiv:1411.4734, 2015. (9pgs).
Laina et al.,"Deeper depth prediction with fully convolutional residual networks," arXiv preprint arXiv:1606.00373, 2016. (12pgs).
Li et al.,"A two-streamed network for estimating fine-scaled depth maps from single rgb images," in ICCV, 2017. (9 pgs).
Cheng et al.,"Depth estimation via affinity learned with convolutional spatial propagation network," ECCV, 2018. (17pgs).
Karsch et al.,"Depth transfer: Depth extraction from video using non-parametric sampling," In IEEE, 2014 (14pgs).
Ladicky et al.,"Pulling things out of perspective," in CVPR, 2014. (8pgs).
Ladicky et al.,"Discriminatively trained dense surface normal estimation," in ECCV, 2014. (17pgs).
Wang et al.,"Towards unified depth and semantic prediction from a single image," in CVPR, 2015. (10pgs).
Liu et al.,"Deep convolutional neural fields for depth estimation from a single image," arXiv preprint arXiv:1411.6387, 2014.(13pgs).
Li et al.,"Depth and surface normal estimation from monocular images using regression on deep features and hierarchical crfs," in CVPR, 2015. (9pgs).
Wang et al.,"SURGE: surface regularized geometry estimation from a single image," in NIPS, 2016. (9 pgs).
Xie et al.,"Deep3d: Fully automatic 2d-to-3d video conversion with deep convolutional neural networks," arXiv preprint arXiv:1604.03650, 2016. (15 pgs).
Garg et al.,"Unsupervised CNN for single view depth estimation: Geometry to the rescue," arXiv preprint arXiv:1603.04992, 2016. (16 pgs).
Wang et al.,"Learning depth from monocular videos using direct methods," in CVPR, 2018. (9pgs).
Li et al.,"Undeepvo: Monocular visual odometry through unsupervised deep learning," arXiv preprint arXiv:1709.06841, 2018 (6 pgs).
Mahjourian et al.,"Unsupervised learning of depth and ego-motion from monocular video using 3d geometric constraints," arXiv preprint arXiv:1802.05522, 2018.(9 pgs).
Meister et al.,UnFlow: Unsupervised learning of optical flow with a bidirectional census loss, in AAAI, 2018. (9pgs).
Vedula et al.,"Threedimensional scene flow,"in Computer Vision, 1999. The Proceedings of the Seventh IEEE International Conference on, vol. 2. IEEE, 1999. (8 pgs).
Vedula et al.,"Three-dimensional scene flow," IEEE transactions on pattern analysis and machine intelligence, vol. 27, No. 3, pp. 475-480, 2005. (6pgs).
Behl et al.,"Bounding boxes, segmentations and object coordinates:important is recognition for 3d scene flow estimation in autonomous driving scenarios?" in CVPR, 2017.(10pgs).
Vogel et al.,"Piecewise rigid scene flow," in Computer Vision (ICCV), 2013 IEEE International Conference on. IEEE, 2013. (2 pgs).
Beall et al.,"A continuous optimization approach for efficient and accurate scene flow," arXiv preprint arXiv:1607.07983, 2016. (16 pgs).
Mayer et al.,"A large dataset to train convolutional networks for disparity, optical flow, and scene flow estimation," in CVPR, 2016. (9pgs).
Simonyan et al.,"Very deep convolutional networks for large-scale image recognition," arXiv:1409.1556, 2015. (14 pgs).
Fragkiadaki et al.,"Learning to segment moving objects in videos," in CVPR, 2015. (8pgs).
Yoon et al.,"Pixellevel matching for video object segmentation using convolutional neural networks," In ICCV, 2017. (10pgs).
Tokmakov et al.,"Learning to segment moving objects," arXiv preprint arXiv:1712.01127, 2017. (18pgs).
Wang et al.,"Saliency-aware video object segmentation," In IEEE, 2017. (14pgs).
Faktor et al.,"Video segmentation by non-local consensus voting," in BMVC, vol. 2, No. 7, 2014. (12 pgs).
Brox et al.,"Object segmentation by long term analysis of point trajectories," in European conference on computer vision. Springer, 2010, pp. 282-295 (14pgs).

(56) References Cited

OTHER PUBLICATIONS

Barnes et al.,"Driven to distraction:Self-supervised distractor learning for robust monocular visual odometry in urban environments,"arXiv preprint arXiv:1711.06623, 2018.(7pg.
Revaud et al.,"Epicflow:Edge-preserving interpolation of correspondences for optical flow," arXiv preprint arXiv:1501.02565, 2015. (11pgs).
Ioffe et al.,"Batch normalization: Accelerating deep network training by reducing internal covariate shift," arXiv preprint arXiv:1502.03167, 2015.(11pgs).
Kingma et al.,"Adam: A method for stochastic optimization," arXiv preprint arXiv:1412.6980, 2017. (15pgs).
Wang et al.,"Learning depth from monocular videos using direct methods,"in Proceedings of the IEEE Conference on Computer Vision and Pattern Recognition, 2018. ( 9pgs).
Long et al.,"Fully convolutional networks for semantic segmentation," in CVPR, 2015. (10pgs).
Kuznietsov et al.,"Semi-supervised deep learning for monocular depth map prediction," arXiv preprint arXiv:1702.02706, 2017(14 pgs).
Saxena et al.,"Learning depth from single monocular images," in Advances in neural information processing systems, 2006. (8pgs).
Janai et al.,"Unsupervised learning of multi-frame optical flow with occlusions," in Proceedings of the European Conference on Computer Vision (ECCV), 2018. (17pgs).
Ros et al.,"The synthia dataset: A large collection of synthetic images for semantic segmentation of urban scenes," in CVPR, 2016. (10pgs).
Luo et al.,"Every Pixel Counts ++: Joint Learning of Geometry and Motion with 3D Holistic Understanding," arXiv preprint arXiv:1810.06125, 2018. (15 pgs).
Yin et al.,"Geonet: Unsupervised learning of dense depth, optical flow and camera pose," CVPR, 2018. (10 pgs).
Ranjan et al.,"Competitive Collaboration: Joint UnsupervisedLearning of Depth, Camera Motion,OpticalFlow & Motion Segmentation," arXiv preprint arXiv:1805.09806, 2018. (16pgs).
Zou et al.,"Df-net: Unsupervised joint learning of depth and flow using cross-task consistency," arXiv preprint arXiv:1809.01649, 2018. (18pgs).
Torresani et al.,"Nonrigid structure-frommotion:Estimating shape and motion with hierarchical priors," IEEE transactions on pattern analysis and machine intelligence, vol. 30, No. 5, pp. 878-892, 2008. (15 pgs).
Godard et al.,"Digging into self-supervised monocular depth estimation," arXiv preprint arXiv:1806.01260, 2018. (24pgs).
Geiger et al.,"Are we ready for Autonomous Driving?The KITTI Vision Benchmark Suite," in CVPR, 2012. (8pgs).
Saxena et al.,"Make3D: Learning 3D scene structure from a single still image," IEEE transactions on pattern analysis & machine intelligence, 2009. (16 pgs).
Butler et al.,"A naturalistic open source movie for optical flow evaluation," In ECCV, 2012. (15 pgs).
Bleyer et al.,"Patchmatch stereo-stereo matching with slanted support windows," in Bmvc, vol. 11, 2011, pp. 1-11.(11 pgs).
Casser et al.,"Depth prediction without the sensors: Leveraging structure for unsupervised learning from monocular videos," arXiv preprint arXiv:1811.06152, 2018. (8 pgs).
He et al.,"Mask R-CNN," arXiv preprint arXiv:1703.0687, 2018. (12pgs).
Wang et al.,"Image quality assessment: from error visibility to structural similarity," IEEE transactions on image processing, vol. 13, No. 4, pp. 600-612, 2004. (14pgs).
Black et al.,"The robust estimation of multiple motions:Parametric and piecewise-smooth flow fields,"Computer vision & image understanding,vol. 63, No. 1, pp. 75-104, 1996, [online], [Retrieved Mar. 25, 2020]. Retrieved from Internet <<URL: https://pdfs.semanticscholar.org/5200/3e425e2d0e33fc0e6cc79050df67b4fbaf13.pdf?_ga=2.258229834.1922353281.1585189100-1639512432.1583291200> (2pgs).
Ilg et al.,"Flownet 2.0: Evolution of optical flow estimation with deep networks," in CVPR, 2017. (9pgs).
Ranjan et al.,"Optical flow estimation using a spatial pyramid network," In CVPR, 2017. (10pgs).
Sun et al.,"Pwc-net: Cnns for opticalflow using pyramid, warping, and cost volume," In CVPR, 2018. (10pgs).
Dosovitskiy et al.,"Flownet: Learning optical flow with convolutional networks," In ICCV, 2015. (9pgs).

\* cited by examiner

JOINT LEARNING OF GEOMETRY AND MOTION WITH THREE-DIMENSIONAL HOLISTIC UNDERSTANDING

BACKGROUND

A. Technical Field

The present disclosure relates generally to systems and methods for image processing. More particularly, the present disclosure relates to systems and methods to estimate 3D geometries of a scene.

B. Background

Learning to estimate 3D geometry in a single frame and optical flow from consecutive frames by watching unlabeled videos via deep convolutional network has made significant process recently. Current state-of-the-art (SOTA) methods treat the tasks independently. One important assumption of the current depth estimation pipeline is that the scene contains no moving object, which can be complemented by the optical flow. However, real world videos may contain moving objects, which is inconsistent with rigid scene assumption commonly used in these frameworks. Such inconsistency may yield to inaccurate geometry and three-dimensional motion estimation results.

Accordingly, what is needed are systems and methods that can jointly learn geometry and motion with three-dimensional holistic understanding.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 graphically depicts a pipeline of a framework for image processing with holistic 3D understanding, according to embodiments of the present disclosure.

DETAILED DESCRIPTION OF EMBODIMENTS

Figure 1:
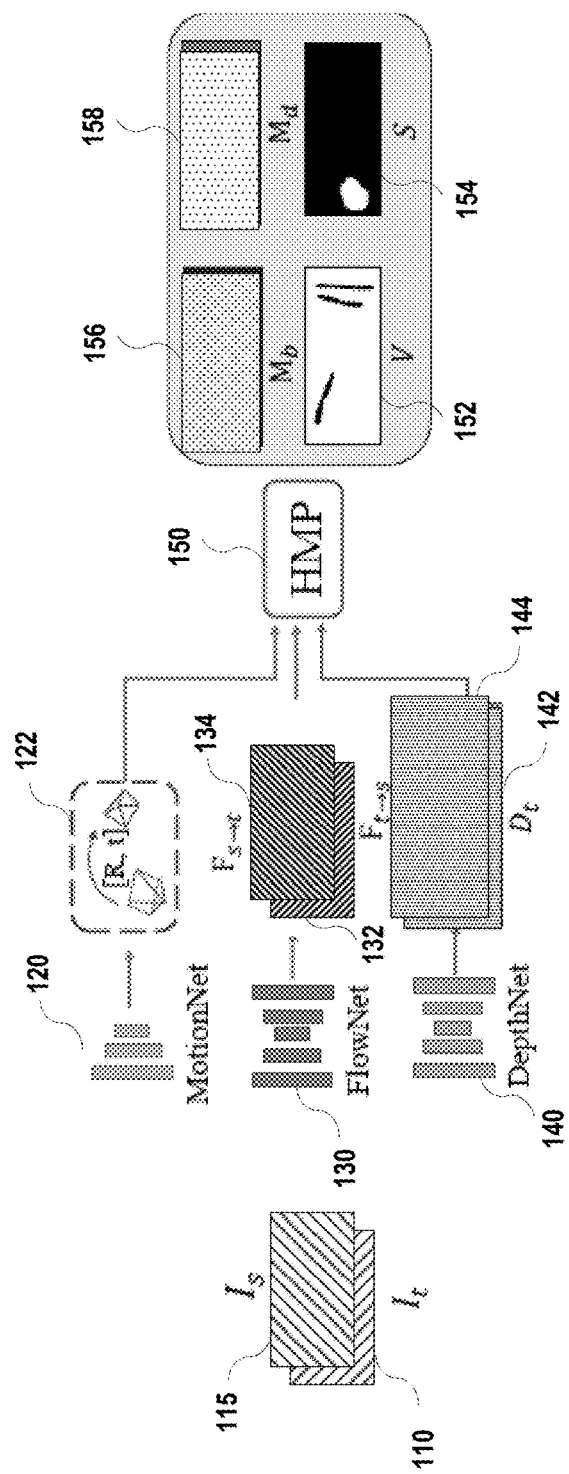

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Humans are highly competent at recovering 3D scene geometry and object motion at a very detailed level, e.g., per-pixel depth and optical flow. They obtain rich 3D understanding of geometry and object movement from visual perception. 3D perception from images and videos is widely applicable to many real-world tasks such as augmented reality, video analysis and robotics navigation. In this patent document, a learning framework is disclosed for inferring dense and 3D geometry and motion understanding jointly without use of annotated training data. Instead, only unlabeled videos are used to provide self-supervision. The 3D geometry estimation includes per-pixel depth estimation from a single image and the motion understanding includes two dimensional (2D) optical flow, camera motion and 3D object motion.

Recently, for unsupervised single image depth estimation, impressive progress has been made to train a deep network taking only unlabeled samples as input and using 3D reconstruction for supervision, yielding even better depth estimation results than those of supervised methods in outdoor scenarios. The core idea is to supervise depth estimation through view synthesis via rigid structure from motion (SfM). The image of one view (source) is warped to another (target) based on the predicted depth map of target view and relative 3D camera motions. The photometric error between the warped frame and target frame is used to supervise the learning. A similar idea also applies when stereo image pairs are available.

However, real world videos may contain moving objects, which is inconsistent with rigid scene assumption commonly used in these frameworks. Some tried to avoid such errors by inducing an explanability mask, where both pixels from moving objects and occluded regions images are ignored during training. Some separately tackle moving objects with a multi-rigid body model by estimating k object masks and k object pivots from the motion network. This system requires placing a limitation on the number of objects, and yields worse geometry estimation results than systems not explicitly modeling moving objects. In this patent document, a moving object mask is explicitly computed from jointly estimated depth and optical flow, which distinguishes the motion induced between camera and object motion. Compared to the corresponding results from other SOTA approaches specifically handling the task, the visualization results from the joint estimation are noticeably better on all three tasks.

On the other hand, optical flow estimates dense 2D pixel movements, which models both rigid and non-rigid motion in the scene. Supervising a flow network through view synthesis has been firstly proposed; a learning strategy aware of occlusion to avoid unnecessary view matches has been introduced later. Nevertheless, these systems lack the understanding of the holistic 3D geometry, yielding difficulties in regularization of the learning process, e.g., on the occluded regions. Unlike previous approaches, this patent document discloses methods and systems to model dense 3D motion for unsupervised/self-supervised learning, which jointly considers depths and optical flow encouraging their inter-consistency. Specifically, given two consecutive frames, the 2D pixel motion is interpreted as caused by the movement of a 3D point cloud, also known as 3D scene flow, by integrating optical flow and depth cues. The movement of those 3D points is then decomposed with respect to camera motion and object motion, where every pixel in the images is holistically understand and thus counted in 3D estimation. The two information items are shown to be mutually reinforced, which helps provide significant performance boost over other SOTA methods.

FIG. 1 graphically depicts a pipeline of a framework 100 (which is also referred as "EPC++" hereinafter) for image processing with holistic 3D understanding, according to one or more embodiments of the present disclosure. Specifically, giving a pair of images comprising a first image $I_t$ 110 (also referred as the target image hereinafter) and a second image $I_s$ 115 (also referred as the source image hereinafter) different from the first image, an optical flow network 130 is introduced first to produce two flow maps: a forward flow $F_{t \to s}$ 132 and a backward flow $F_{s \to t}$ 134. In one or more embodiments, the two images are consecutive frames, with the first image 110 taken before the second image 115. A motion network 120 is used to output their relative camera motion or pose $T_{t \to s}$ 122, and a single view depth network 140 outputs depths $D_t$ 142, $D_s$ 144 for the two images respectively. The three types of information (2D flow, camera pose and depth maps) are fused into a holistic motion parser (HMP) 150, where a visibility/non-occlusion mask V 152, a moving object segmentation mask S 154, a per-pixel 3D motion for rigid background $M_b$ 156 and a moving objects $M_d$ 158 are recovered following geometrical rules and consistency.

In one or more embodiments, the 3D motion flow of rigid background $M_b$ 156 is computed using depth $D_t$ 142 of the target image $I_t$ 110 and the relative camera pose $T_{t \to s}$ 122. In addition, a full 3D scene flow may be computed given the optical flow $F_{t \to s}$ 132 and depths $D_t$, $D_s$ of the two images. In principle, for pixels that are non-occluded in $I_s$, i.e., V=1, subtracting the two 3D flows in rigid regions, the error should be zero, while inside a moving object region, the residual yields the 3D motion of moving objects $M_d$, which should be significantly larger than that from the background, yielding a mask of moving objects. For pixels that are occluded, $I_s$, $M_b$ 156 may be used to inpaint optical flow by leveraging cues from depth information, which is more accurate than using bilinear interpolation. The above principles are used to guide the design of losses, and learning strategies for the networks; all the operations inside the parser are easy to compute and differentiable. Therefore, the system can be trained end-to-end, which helps the learning of both depth estimation and optical flow prediction.

Figure 2:
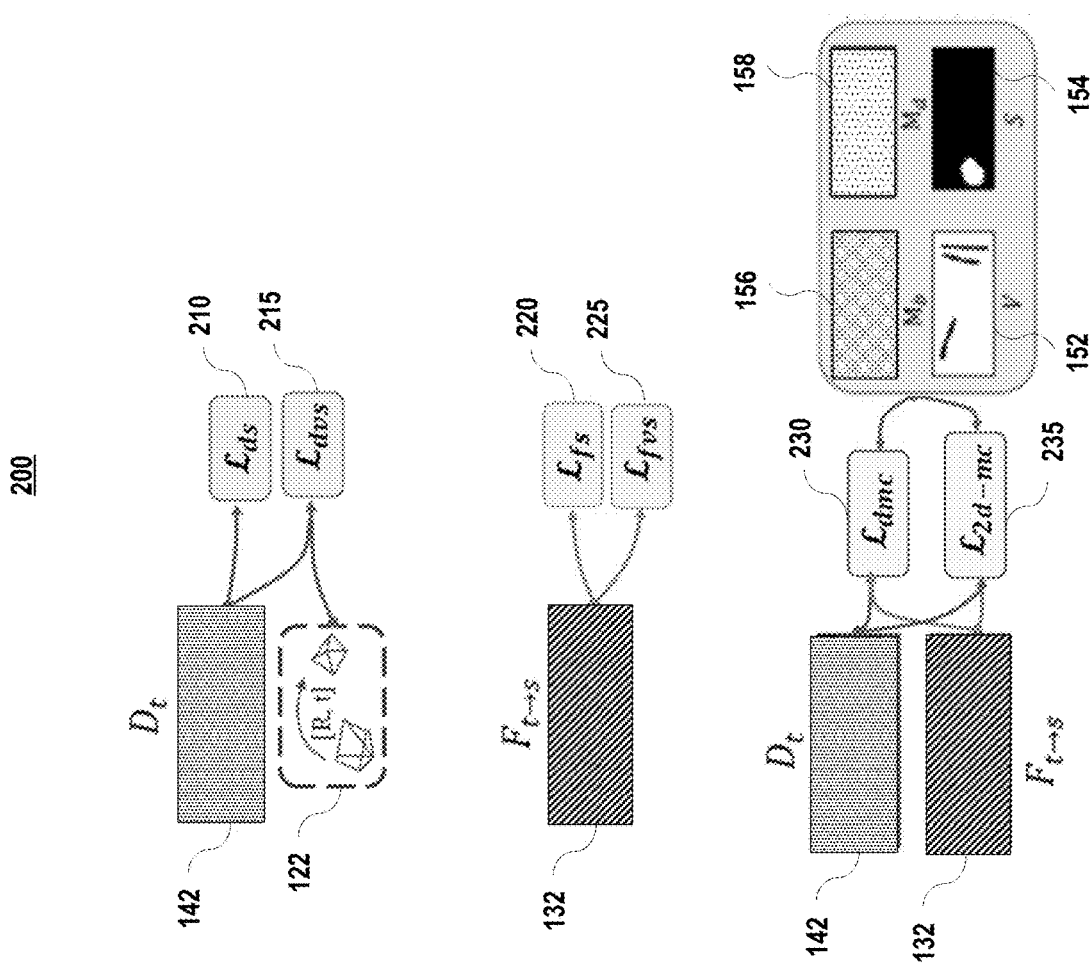
FIG. 2 graphically depicts various loss terms used to effectively train corresponding networks in the framework, according to embodiments of the present disclosure.

In one or more embodiments, the motion network 120, the optical flow network 130, the depth network 140, and the HMP 150 may be trained individually or jointly using one or more losses associated with at least one of motion consistency, synthesis, and smoothness. The losses for synthesis and smoothness may comprise corresponding losses for both depth and optical flow. The loss motion consistency may also comprise terms for both 3D motion consistency and 2D motion consistency. FIG. 2 graphically depicts various loss terms used to effectively train corresponding networks in the pipeline according to one or more embodiments of the present disclosure. As shown in FIG. 2, the depths $D_t$ 142 and the relative camera pose $T_{t \to s}$ 122 may be used, jointly or individually, in a smoothness loss for depth $\mathcal{L}_{ds}$ 210 and a view synthesis loss for depth $\mathcal{L}_{dvs}$ 215. The forward flow $F_{t \to s}$ 132 may be used in both a smoothness loss for optical flow $\mathcal{L}_{fs}$ 220 and a view synthesis loss for optical flow $\mathcal{L}_{fvs}$ 225. The depths $D_t$ 142 and the forward flow $F_{t \to s}$ 132 may be used jointly in a 3D motion consistency loss $\mathcal{L}_{dmc}$ 230 and a 2D motion consistency loss $\mathcal{L}_{2d-mc}$ 235. Details of these losses and training methods may be found in Section C.2.2 and Section C.2.3.

Last but not the least, for a monocular video, the depth and object motion are two entangled information, which depends on the given projective camera model. For example, from the view point of a camera, a very close object moving with the camera is equivalent to a far object keeping relatively still, yielding scale confusion for depth estimation. This is an ill-posed problem; this is addressed by incorporating stereo image pairs into the learning framework during training stage. Finally, EPC++ successfully decomposes the background and foreground motion, thus every pixel which contributes to the photometric error may be explained and interpreted explicitly, yielding better depth, optical flow and motion segmentation results than approaches which are specifically designed for one task.

Extensive experiments are conducted on various datasets, and results are evaluated in multiple aspects including depth estimation, optical flow estimation, 3D scene flow estimation, camera motion and moving object segmentation. As elaborated in Section D, EPC++ significantly outperforms other SOTA methods on all tasks.

B. Some Related Work

Estimating single view depth, predicting 3D motion and optical flow from images have long been central problems for computer vision. Some related works in various aspects are summarized in this Section.

Structure from motion and single view geometry. Geometric based methods estimate 3D from a given video with feature matching or patch matching, such as PatchMatch Stereo, SfM, Simultaneous Localization and Mapping (SLAM), and Dense Tracking and Mapping (DTAM), and are effective and efficient in many cases. When there are dynamic motions inside a monocular video, usually there is scale-confusion for each non-rigid movement, thus regularization through low-rank, orthographic camera, rigidity or fixed number of moving objects are necessary in order to obtain an unique solution. However, those methods assume the 2D matching are reliable, which can fail at where there is low texture, or drastic change of visual perspective, etc. More importantly, those methods cannot extend to single view reconstruction.

Traditionally, specific and strong assumptions are necessary for estimating depth from single view geometry, such as computing vanishing point, following assumptions of bidirectional reflectance distribution function (BRDF), or extract the scene layout with major plane and box representations, etc. These methods typically only obtain sparse geometry representations, and some of them require certain assumptions (e.g., Lambertian, Manhattan world).

Supervised depth estimation with CNN. Deep neural networks (DNN) developed in recent years provide stronger feature representation. Dense geometry, i.e., pixel-wise depth and normal maps, can be readily estimated from a single image and trained in an end-to-end manner. The learned CNN model shows significant improvement compared to other methods which were based on hand-crafted features. Others tried to improve the estimation further by appending a conditional random field (CRF). However, all these supervised methods require densely labeled ground truths, which are expensive to obtain in natural environments.

Unsupervised single image depth estimation. Most recently, many CNN based methods are proposed to do single view geometry estimation with supervision from stereo images or videos, yielding impressive results. Some of them are relying on stereo image pairs, e.g., warping one image to another given known stereo baseline. Some others are relying on monocular videos by incorporating 3D camera pose estimation from a motion network. However, as discussed in Section A, most of these models only consider a rigid scene, where moving objects are omitted. Some model rigid moving objects with k motion masks, while their estimated depths are negatively affected by such an explicit rigid object assumption comparing to the one without object modeling. However, these methods are mostly based solely on photometric error, i.e., $\|I_s(p_t)-\hat{I}_t(p_t)\|$, which uses a Lambertian assumption, and are not robust in natural scenes with very variable lighting conditions. To handle the problem, supervision based on local structural errors, such as local image gradient, non-local smoothness and structural similarity (SSIM), yields more robust matching and shows additional improvement on depth estimation. Most recently, the results are further improved by jointly considering stereo and monocular images with updated neural architectures. Unlike those approaches, this patent document jointly consider the learning of optical flow network, in which more robust matching can be learned, yielding better results for estimated depths.

Optical flow estimation. Similarly, there is a historical road map for optical flow estimation from traditional dense feature matching with local patterns, such as Patch matching, Piece-wise matching and SIFT flow, to supervised learning based on convolutional neural networks (CNNs), such as FlowNet, SPyNet, and PWC-Net, etc. These produce significantly better performance due to deep hierarchical feature including larger while flexible context. However, fully supervised strategies requires high quality labelled data for generalization, which is non-trivial to obtain.

The unsupervised learning of optical flow with a neural network was first introduced by training CNNs with image synthesis and local flow smoothness. Most recently, the results have been improved by explicitly computing the occlusion masks where photometric error are omitted during the training, yielding more robust learned results. However, these works do not have 3D scene geometry understanding, e.g., depths and camera motion from the videos, of the optical flow. In this patent document, such an understanding is leveraged and a significant improvement over previous SOTA results is shown.

3D Scene flow by joint depth and optical flow estimation. Estimating 3D scene flow is a task of finding per-pixel dense flow in 3D given a pair of images, which requires joint consideration of depths and optical flow of given consecutive frames. Traditional algorithms estimate depths from stereo images, or the given image pairs assuming rigid constraint, and trying to decompose the scene to piece-wise moving planes in order to finding correspondence with larger context. Most recently, semantic object instance segmentation and supervised optical flow from DispNet (Mayer, et al., "*A large dataset to train convolutional networks for disparity optical flow, and scene flow estimation*", in CVPR, 2016) have been adopted to solve large displacement of objects, yielding the best results on some benchmark dataset.

Most recently, works in unsupervised learning have begun to consider depths and optical flow together. A residual FlowNet back on ResNet (He et al., "*Deep residual learning for image recognition*", CVPR, 2016) has been used to refine the rigid flow to the full optical flow, but it did not account for the moving objects or handle the occlusion, and the depth estimation did not benefit from the learning of optical flow. Someone pasted the optical flow from objects to the rigid flow from background and ego-motion to explain the whole scene in an adversarial collaboration. However, rather than measuring 3D motion consistency, the whole image was divided with a selected threshold. One or more embodiments herein model from the perspective of 3D scene flow, which is embedded in the presented unsupervised learning pipeline, yielding better results even with weaker backbone networks, i.e., VGG, demonstrating the effectiveness of EPC++.

Segment moving objects. Finally, since one or more methodology embodiments in this patent document decomposes static background and moving objects, the disclosed approach is also related to segmentation of moving objects from a given video. Current contemporary SOTA methods are dependent on supervision from human labels by adopting CNN image features or RNN temporal modeling.

For unsupervised video segmentation, saliency estimation based on 2D optical flow is often used to discover and track the objects, and long trajectories of the moving objects based on optical flow should be considered. However, these approaches commonly handle non-rigid objects within a relative static background. Most recently, it has been shown that explicitly modeling moving things with a 3D prior map can avoid visual odometry drifting. One or more embodiments herein also considers moving object segmentation, which is under an unsupervised setting with videos.

C. Embodiments of Learning with Holistic 3D Motion Understanding

As discussed in Section A, in one or more embodiments, per-pixel 3D motion understanding is obtained by jointly modeling depth and optical flow, which is dependent on learning methods considering depth and optical flow independently.

In the following, the geometry relationship between the two types of information is firstly elaborated, and the details about the how the rules of 3D geometry in EPC++ learning framework (Section C.1) leveraged through HMP are then discussed. Finally, all loss functions and training strategies are clarified. In one or more embodiments, the training strategies consider both stereo and monocular images in training, with awareness of 3D motion dissected from HMP.

1. Geometrical Understanding with 3D Motion

Figure 3:
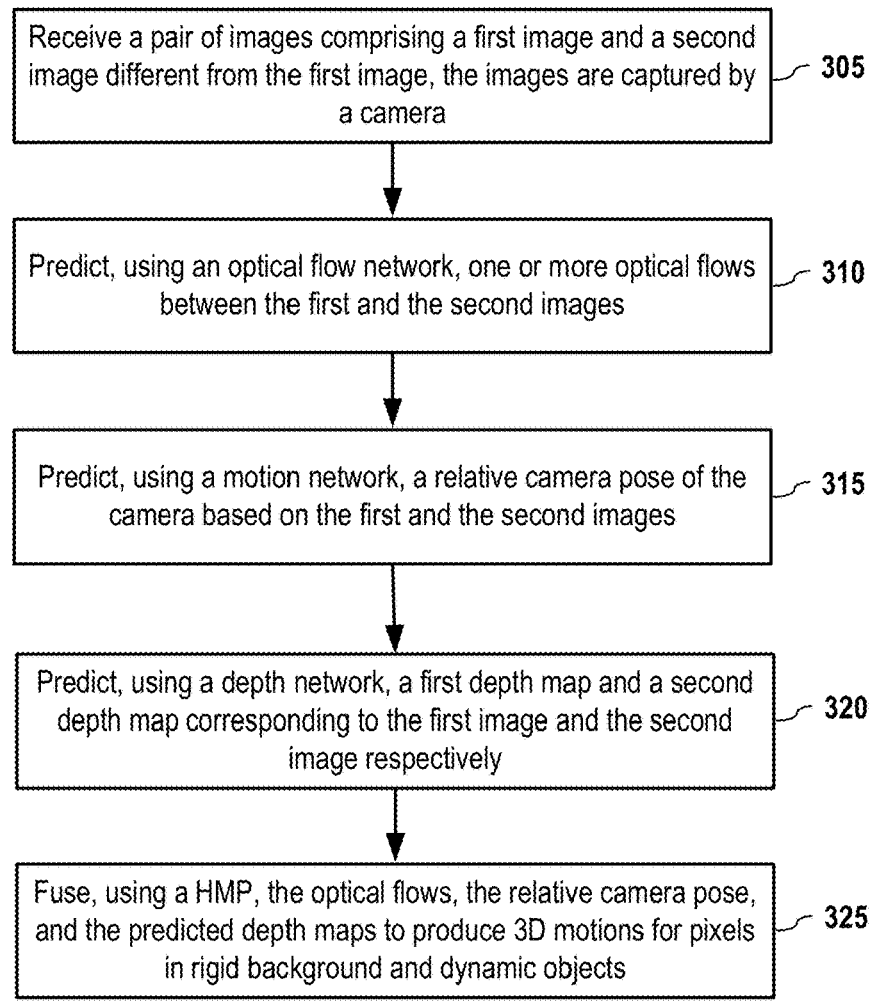
FIG. 3 depicts a method for producing 3D motions for pixels in rigid background and dynamic objects with the framework, according to embodiments of the present disclosure.

FIG. 3 depicts a method for producing 3D motions for rigid background and dynamic objects with the framework according to embodiments of the present disclosure. A pair of images comprising a first image (a target view image $I_t$) and a second image (a source view image $I_s$) is firstly received (305). In one or more embodiments, the two images are consecutive frames, with the first image typically being taken before or after the second image. An optical flow network predicts (310) one or more optical flows between the first and second images. In one or more embodiments, the one or more optical flows comprise a forward flow $F_{t \to s}$ and a backward flow $F_{s \to t}$. A motion network predicts (315) a relative camera transformation $T_{t \to s}$ based on the first and the second images. A depth network predicts (320) a first and a second depth maps $D_t$, $D_s$ corresponding to the first and the second image $I_t$, $I_s$ respectively. An HMP fuses (325) the one or more optical flows, the relative camera pose, and the predicted depth maps to produce 3D motions for pixels in rigid background and dynamic objects.

Giving the target view image $I_t$, the source view image $I_s$, the depth maps $D_t$, $D_s$ of $I_t$, $I_s$, the relative camera transformation is $T_{t \to s} = [R|t] \in \mathcal{S}\varepsilon(3)$ from $I_t$ to $I_s$, and the optical flow $F_{t \to s}$ from $I_t$ to $I_s$, the corresponding pixel $p_s$ in $I_s$ for one pixel $p_t$ in $I_t$ may be found either through camera perspective projection or with given optical flow, and the two should be consistent. In one or more embodiments, the computation may be written as:

$$h(p_s) = \pi(K[T_{t \to s} D_t(p_t) K^{-1} h(p_t) + M^*_d(p_t)])$$

$$p_s = p_t + F_{t \to s}(p_t) \quad (1)$$

where $D_t(p_t)$ is the depth value of the target view at pixel $p_t$, and K is the camera intrinsic matrix, $h(p_t)$ is the homogeneous coordinate of $p_t$. $\pi(x)$ is a scaling function that rescale the vector by its last element, i.e., $x/x_d$ where d is the vector dimension. Here, d=3 and the last element is the projected depth value at $p_s$ from $p_t$, which is represented by $\hat{D}_s(p_s)$. $M^*_d$ is the 3D motion of dynamic moving objects relative to the world. In this way, every pixel in $I_t$ is explained geometrically. Here, $p_s$ may be outside of the image $I_s$, or non-visible in $I_s$ when computing optical flow, which is also evaluated in optical flow estimation using various datasets.

Commonly, one may design CNN models for predicting $D_t$, $D_s$, $T_{t \to s}$, $F_{t \to s}$. After computed the corresponding $p_t$ and $p_s$, those models may be supervised through synthesizing a target image $\hat{I}_t$ by, $$\hat{I}_t(p_t) = V(p_t) \psi(p_s | I_s) \quad (2)$$

using the photometric loss, $$\mathcal{L}_p = \Sigma_{p_t} V(p_t) |I_t(p_t) - \hat{I}_t(p_t)| \quad (3)$$

Here, $\psi(p_s | I_s)$ is implemented by using a spatial transformer network, thus the models may be trained end-to-end, and $V(p_t)$ is a visibility mask which is 1 (i.e., not masked) when $p_t$ is also visible in $I_s$, and 0 (i.e., masked) if $p_t$ is occluded or falls out of view.

In one or more embodiments, dropping the depth prediction models, i.e., models for predicting $D$, $T_{t \to s}$ in Eq. (1) and adding flow smoothness may yield unsupervised learning of optical flow. On the other hand, in one or more embodiments, dropping optical flow model, and assuming there is no dynamic motion in the scene, i.e., setting $M^*_d=0$ in Eq. (1), and adding depth smoothness may yield unsupervised learning of depths and motions.

In one or more embodiments of this patent document, to holistically model the 3D motion, CNN models are adopted for all optical flow, depths and motion estimation. However, dynamic motion $M_d$ and depths $D_{s/t}$ are two conjugate pieces of information, where there always exists a motion pattern that can exactly compensate the error caused by inaccurate depth estimation. Considering matching $p_t$ and $p_s$ based on RGB (red-green-blue) values could also be noisy, this yields an ill-posed problem with trivial solutions that prevent stable learning. Therefore, effective learning strategies are needed with strong regularization to provide effective supervision for all those networks, which are described later in this patent document.

Holistic 3D motion parser (HMP). In order to make the learning process feasible, it is necessary to distinguish between the motion from rigid background/camera motion and dynamic moving objects, regions of visible and occluded, where at visible rigid regions structure-from-motion may be relied on for training depths, and at moving regions 3D object motions may be found. As illustrated in FIG. 1, this is handled through an HMP that takes in the provided information from three networks, e.g., DepthNet 140, MotionNet 130 and FlowNet 120, and outputs the desired dissected dense motion maps 156 and 158 for background and moving things respectively.

In one or more embodiments, given depths of both images $D_t$ and $D_s$, the learned forward/backward optical flow $F_{t \to s/s \to t}$, and the relative camera pose $T_{t \to s}$, the motion induced by rigid background $M_b$ and dynamic moving objects $M_d$ from HMP may be computed as:

$$M_b(p_t) = T_{t \to s} \phi(p_t | D_t) - \phi(p_t | D_t),$$

$$M_d(p_t) = V(p_t)[\phi(p_t + F_{t \to s}(p_t) | D_s) - \phi(p_t | D_t) - M_b(p_t)],$$

$$V(p_t) = \mathbf{1}(\Sigma_p(1 - |p_t - (p + F_{s \to t})|) > 0),$$

$$S_t(p_t) = 1 - \exp\{-\alpha(M_d(p_t)/D_t(p_t))\} \quad (4)$$

where p is a symbol for summation index (refers to every pixel location). $\phi(p_t | D_t) = D_t(p_t) K^{-1} h(p_t)$ is a back-projection function from 2D to 3D space. $\mathbf{1}()$ is a function equal to 1 if the statement in the bracket is true. Note here $M_d(p_t)$ is the dynamic per-pixel 3D motion at visible regions, and V is the visibility mask as mentioned in Eq. (2), which follows the rule of occlusion estimation from the optical flow $F_{s \to t}$. S is a soft moving object mask, which is computed for separating the rigid background and dynamic objects. a is an annealing hyper parameter and will be changed at different stage of training, which is elaborated in Section C.2.2.

Figure 4:
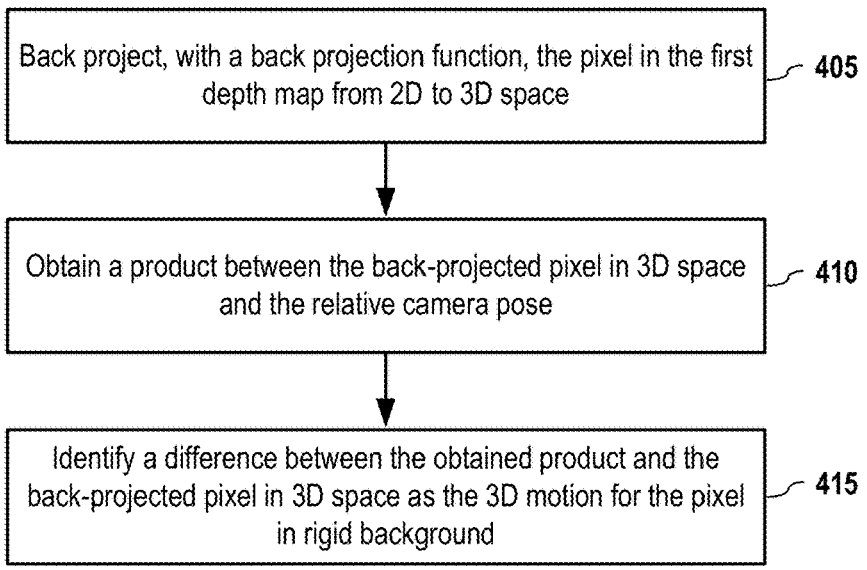
FIG. 4 depicts a method for producing 3D motion for one pixel in rigid background, according to embodiments of the present disclosure.

FIG. 4 depicts a method for producing 3D motion $M_b(p_t)$ for one pixel in rigid background according to embodiments of the present disclosure. The pixel in the first depth map $D_t(p_t)$ is back projected (405) from 2D space to 3D space using a back-projection function $\phi(\ )$. A product is obtained (410) between the back-projected pixel in 3D space $\phi(p_t|D_t)$ and the relative camera pose $T_{t \to s}$. The difference between the obtained product $T_{t \to s}\phi(p_t|D_t)$ and the back-projected pixel in 3D space $\phi(p_t|D_t)$ is identified (415) as the 3D motion for one pixel $M_b(p_t)$ in rigid background.

Figure 5:
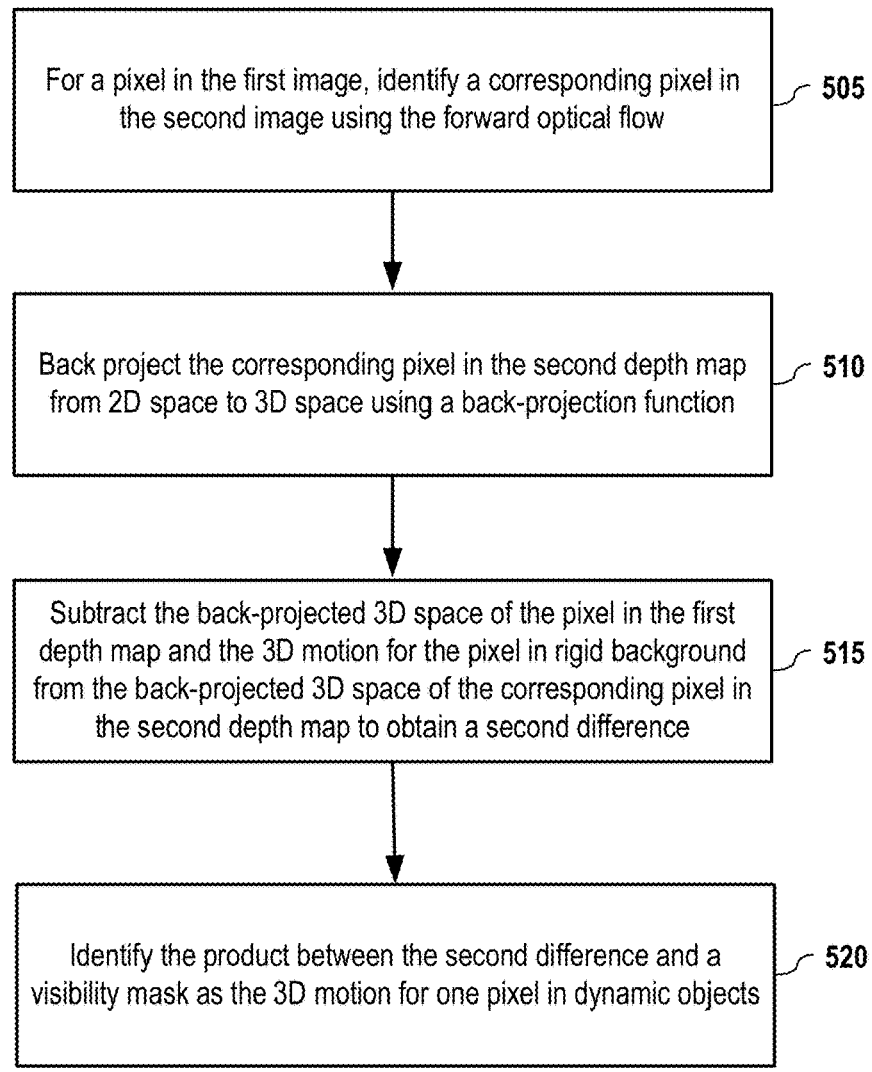
FIG. 5 depicts a method for producing 3D motion for one pixel in one or more dynamic objects, according to embodiments of the present disclosure.

FIG. 5 depicts a method for producing 3D motion $M_d(p_t)$ for one pixel in one or more dynamic objects according to embodiments of the present disclosure. For a pixel $p_t$ in the first (target) image, a corresponding pixel $p_s = p_t + F_{t \to s}(p_t)$ in the second (source) image $I_s$ is identified (505) using the forward optical flow $F_{t \to s}$. The corresponding pixel in the second depth map $D_s(p_t + F_{t \to s}(p_t))$ is back projected (510) from 2D space to 3D space using a back-projection function $\phi(\ )$. The back-projected 3D space $\phi(p_t|D_t)$ of the pixel in the first depth map and the 3D motion for the pixel in rigid background $M_b(p_t)$ are both subtracted (515) from the back-projected 3D space $\phi(p_t + F_{t \to s}(p_t)|D_s)$ of the corresponding pixel in the second depth map $D_s$ to obtain a second difference $([\phi(p_t + F_{t \to s}(p_t)|D_s) - \phi(p_t|D_t) - M_b(p_t)])$. The product between the obtained second difference and a visibility mask $V(p_t)$ is identified (520) as the 3D motion for one pixel $M_d(p_t)$ in dynamic objects.

After HMP, the rigid and dynamic 3D motions are disentangled from the whole 3D motion, where various supervision may be applied accordingly based on structural error and regularization, and drives the joint learning of depth, motion and flow networks.

2. Embodiments of Training the Networks

It shall be noted that these training embodiments and results are provided by way of illustration and were performed under specific conditions using a specific embodiment or embodiments; accordingly, neither these training embodiments nor their results shall be used to limit the scope of the disclosure of the current patent document.

In this section, the networks for predicting are first introduced, followed by losses designed for unsupervised learning.

2.1 Embodiments of Network Architectures

In one or more embodiments, for depth prediction D and motion estimation T between two consecutive frames, a network architecture is adopted depending on a VGG based encoder to acquire better ability in capturing image details. In addition, for motion prediction, the decoder is dropped for their explanability mask prediction since the occlusion mask and moving object masks may be directly inferred through the HMP module to avoid error matching.

In one or more embodiments, for optical flow prediction F, a light-weighted network architecture, e.g., PWC-Net, is used to learn a robust matching, which is almost 10× smaller than the network of FlowNet, while producing higher matching accuracy in unsupervised setting.

Some detailed embodiments of all these networks are described in the experimental section Sec. D.

2.2 Embodiments of Training Losses.

After HMP Eq. (4), the system generates various outputs, including: 1) depth map D from a single image I, 2) relative camera motion T, 3) optical flow map F, 4) rigid background 3D motion $M_b$, 5) dynamic 3D motion $M_d$, 6) visibility mask V, and 7) moving object mask S. Different loss terms are also used to effectively train corresponding networks as illustrated in pipeline shown in FIG. 1.

Structural matching. As discussed in Section B, photometric matching as proposed in Eq. (3) for training flows and depths is not robust against illumination variations. In one or more embodiments, in order to better capture local structures, additional matching cost from SSIM is added and described as the following:

$$\mathcal{L}_{vs}(O) = \Sigma_{p_t} V(p_t) * s(I_t(p_t), \hat{I}_t(p_t)),$$

where, $$s(I(p), \hat{I}(p)) = (1-\beta) * |I(p) - \hat{I}(p)| + \beta * (1 - \frac{1}{2} SSIM(I(p), \hat{I}(p))) \quad (5)$$

Here, $\beta$ is a balancing hyper-parameter which is set to be 0.5. O represents the type of input for obtaining the matching pixels, which could be D or F as introduced in Eq. (1). view synthesis loss terms for depth and optical flow are denoted as $\mathcal{L}_{dvs}$ (215), $\mathcal{L}_{fvs}$ (225) respectively (as shown in FIG. 2). Then, these losses may be directly applied to learn the flow, depth and motion networks.

Edge-aware local smoothness. Although the structural loss alleviates the appearance confusion of view synthesis, the matching pattern is still a very local information. Therefore, smoothness is commonly adopted for further regularizing the local matching to improve the results. In experiments, two types of smoothness including edge-aware smoothness from image gradient, or smoothness with learned affinity were tried. It was found that when using only photometric matching (Eq. (2)), learned affinity provides significant improvements for final results over image gradient, but when adding structural loss (Eq. (5)), the improvements from learned affinity becomes very marginal. From perspective in this patent document, this is mostly due to the robustness from SSIM and the self-regularization from CNN. Therefore, in this patent document, for simplicity, image gradient based edge-aware smoothness is simply used to regularize the learning of different networks. Formally, the spatial smoothness loss can be written as, $$\mathcal{L}_s(O, W, o) = \Sigma_{p_t} \Sigma_{d \in x, y} W(p_t) |\nabla_d^o O(p_t)| e^{-\alpha |\nabla_d^2 I(p_t)|}, \quad (6)$$

where O represents type of input, W is a weighted factor, and o is the order of smoothness gradient. For example, $\mathcal{L}_s(D, 1-S, 2)$ is a spatial smoothness term penalizes the L1 norm of second-order gradients of depth along both x and y directions inside rigid segmentation mask 1−S, encouraging depth values to align in planar surface when no image gradient appears. Here, 1 is an all one matrix with the same shape as S, and the number 2 represents the $2^{nd}$ order. In experiments of this patent documents, $\mathcal{L}_s(D, 1, 2)$ is performed for depth and $\mathcal{L}_s(F, 1, 2)$ is performed for optical flow. Here, $\mathcal{L}_{ds}$ and $\mathcal{L}_{fs}$ are used to denote the smoothness loss terms for depth and optical flow respectively.

3D motion consistency between depths and flows. Finally, the consistency between learning of depths and flows at the rigid regions is modeled based on the outputs from the HMP. Specifically, $M_d(p_t)$ is required to be small inside the rigid background regions which can be calculated by 1−S. In one or more embodiments, the loss functions may be written as, $$\mathcal{L}_{mc} = \Sigma_{p_t} (1 - S(p_t)) |M_d(p_t)|_1$$

$$\mathcal{L}_{ms} = \mathcal{L}_s(M_s, S, 1) \quad (7)$$

where $\mathcal{L}_s$ is formulated in Eq. (6), and $M_d$, $S(p_t)$ is defined in Eq. (4). Here, $\mathcal{L}_{ms}$ indicates that motion of a single object should be smooth in real world.

However, in the formula, $S(p_t)$ is determined on the magnitude of $M_d$, which is computed as the difference between the motion induced from depths and motion from flows. However, at beginning of the system learning, the prediction of depths and flows can be very noisy, yielding non-reasonable masks. Therefore, α for computing $S(p_t)$ is set to be inf at beginning of system training, where no consistency is asked, so that the flow and depth networks are trained independently. Then, after convergence of individual learning, a was reset to be a small constant 0.01 to further require the consistency of the 3D motion.

In practice, it was found the learning could be made more stable by decomposing the 3D motion consistency into 2D flow consistency and depth consistency. It is believed the reason could be similar to supervised depth estimation, where the estimated 3D motions at long distance may be much noisier than the regions nearby, which induce losses difficult to minimize for the networks. Therefore, by decomposing the 3D motions to 2D motions and depths, such difficulties be alleviated. Specifically, substituting $M_b(p_t)$ for computing $M_d(p_t)$ in Eq. (4), and put in the back-projection function of $\phi(\ )$ given the formula for decomposing the consistency, the motion $M_d$ by moving objects may be written as:

$$M_d(p_t) = V(p_t)[\phi(p_t + F_{t \to s}(p_t) | D_S) - T_{t \to s}\phi(p_t | D_t)]$$
$$= V(p_t)[D_S(p_{sf})K^{-1}h(p_{sf}) - \hat{D}_S(p_{st})K^{-1}h(p_{st})]$$
$$KM_d(p_t) = V(p_t)[D_s(p_{sf})h(p_{sf}) - \hat{D}_s(p_{st})h(p_{st})]$$

where $p_{sf} = p_t + F_{t \to s}(p_t)$ is the corresponding pixel in source image $I_s$ found by optical flow $F_{t \to s}$, and $p_{st}$ is the matching pixel found by using the rigid transform $T_{t \to s}$. Here, $\hat{D}_s$ is the depth map of source image $I_s$ projected from the depth of target image $I_t$ as mentioned in Eq. (1).

Therefore, the loss for 3D motion consistency $\mathcal{L}_{mc}$ is equivalent to.

$$\mathcal{L}_{dmc} = \Sigma_{p_t} V(p_t)(1-S(p_t))(|D_s(p_{sf}) - \hat{D}_s(p_{st})| + |p_{sf} - p_{st}|) \quad (9)$$

where $|D_s(p_{sf}) - \hat{D}_s(p_{st})|$ indicates the depth consistency, and $|p_{sf} - p_{st}|$ indicates flow consistency inside rigid regions. One may easily prove that $\mathcal{L}_{dmc} = 0$ is the necessary and sufficient condition for $\mathcal{L}_{mc} = 0$. Thus, there is no loss of supervision introduced from switching the optimization target.

2D motion consistency between depths and flows. Commonly, optical flow estimation on some benchmark databases also requires flow estimation for pixels inside occlusion regions V, which is not possible when solely using 2D pixel matching. Traditionally, some researchers use local smoothness to "inpaint" those pixels from nearby estimated flows. Thanks to the disclosed 3D understanding in this patent document, those flows may be trained by requiring its geometrical consistency with estimated depth and motion. In one or more embodiments, the loss for 2D flow consistency is written as, $$\mathcal{L}_{2d-mc} = \Sigma_{p_t}(1-V(p_t))|p_{sf} - p_{st}| \quad (10)$$

where $p_{sf}$, $p_{st}$ are defined in Eq. (8). Such a loss is used to drive the supervision of the FlowNet to predicting flows only at nonvisible regions, and surprisingly, it also benefits the flows predicted at visible regions, which may be because well modeling of the occluded pixels helps regularization of training.

Nevertheless, one possible concern of the formula in 3D motion consistency is when the occluded part is from a non-rigid movement, e.g., a car moves behind another car. To handle this problem, it may require further dissecting object instance 3D motions. In the datasets experimented in this patent document, the major part of occlusion (e.g. 95% of the occluded pixels) is from rigid background, which falls into the assumption.

Multi-scale penalization. Finally, in order to incorporate multiscale context for training, four scales for the outputs of D and F are used. In one or more embodiments, the loss functional for depths and optical flow supervision from a monocular video may be written in summary as, $$\mathcal{L}_{mono} = \Sigma_l 2^{l*}\{\lambda_{dvs}\mathcal{L}_{vs}^l(D) + \lambda_{fvs}\mathcal{L}_{vs}^l(F) + \lambda_{ds}\mathcal{L}_{vs}^l(D, 1,2) + \lambda_{fs}\mathcal{L}_s^l(F,1,2) + \lambda_{dmc}\mathcal{L}_{dmc}^l + \lambda_{2d-mc}\mathcal{L}_{2d-mc}^l\} \quad (11)$$

where l indicates the level of image scale, and l=1 indicates the one with the lowest resolution. $2^l$ is a weighting factor for balancing the losses between different scales. $\lambda = [\lambda_{dvs}, \lambda_{fvs}, \lambda_{ds}, \lambda_{fs}, \lambda_{dmc}, \lambda_{2d-mc}]$ is the set of hyper-parameters balancing different losses, and they are elaborated in Methodology 1, below.

2.3 Embodiments of Stage-Wise Learning Procedure

In practice, it may not be effective to put all the losses together (e.g., $\mathcal{L}_{mc}$) to train the network from scratch, e.g., the segmentation mask S can be very noisy at beginning. Therefore, in one or more embodiments, the hyper-parameter set λ was adjusted as the training goes on to switch on or off the learning of networks. In one or more embodiments, a stage-wise learning strategy is adopted to train the framework stage by stage and start the learning of later stages after previous stages are converged. The learning procedure is summarized in methodology 1. Firstly, depth and optical flow networks were learned separately. Then, the consistency between depth and optical flow were enforced through iterative training. In experiments in this patent document, the networks converged after two iterations of training in the iterative training stage, yielding SOTA performance for all the required tasks, which is elaborated in Section D.

Methodology 1: Training procedure for networks with monocular videos

Figure 6:
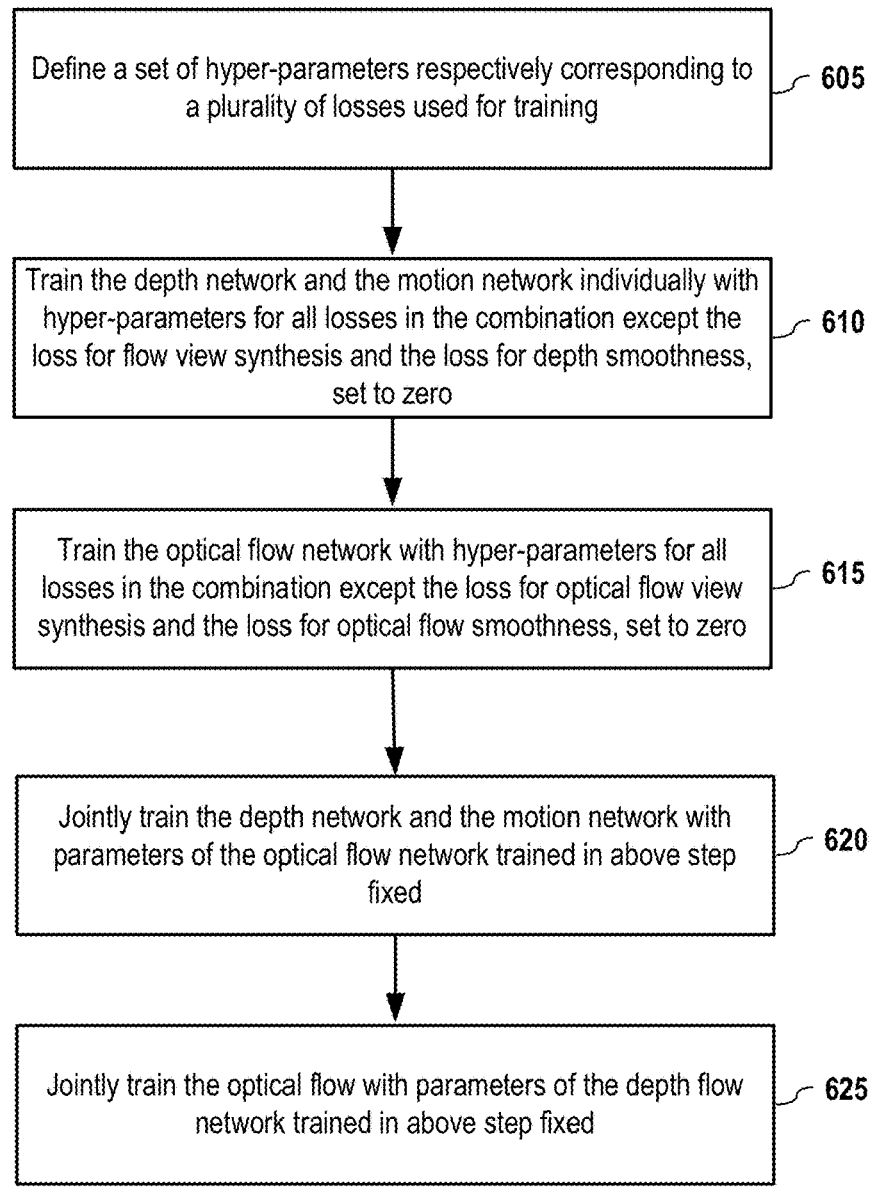
FIG. 6 depicts a method for training the framework with a combination of losses, according to embodiments of the present disclosure.

Result: Trained network for predicting D, T and F
Define $\lambda = [\lambda_{dvs}, \lambda_{fvs}, \lambda_{ds}, \lambda_{fs}, \lambda_{dmc}, \lambda_{2d-mc}]$;
1) Train Depth and Motion networks with λ=[1, 0, 0.5, 0, 0, 0]
2) Train Optical flow network with λ=[0, 1, 0, 0.5, 0, 0];
While do
Train Depth and Motion networks guided by optical flow with λ=[1, 0, 1, 0, 0.05, 0.25].
Train Optical flow network guided by depth flow with λ=[0, 1, 0, 0.5, 0, 0.005].
end FIG. 6 depicts a method for training the framework with a combination of losses according to embodiments of the present disclosure. The method comprises steps of:

Define (605) a set of hyper-parameters ($\lambda_{dvs}, \lambda_{fvs}, \lambda_{ds}, \lambda_{fs}, \lambda_{dmc}$, and $\lambda_{2D-mc}$) respectively corresponding to a plurality of losses ($\mathcal{L}_{dvs}, \mathcal{L}_{fvs}, \mathcal{L}_{ds}, \mathcal{L}_{fs}, \mathcal{L}_{dmc}$, and $\mathcal{L}_{2D-mc}$) used for training the framework;

Train (610) the depth network and the motion network individually with hyper-parameters for all losses in the combination except the loss for flow view synthesis ($\mathcal{L}_{dvs}$) and the loss for depth smoothness ($\mathcal{L}_{ds}$), set to zero;

Train (615) the optical flow network with hyper-parameters for all losses in the combination except the loss for optical flow view synthesis ($\mathcal{L}_{fvs}$) and the loss for optical flow smoothness ($\mathcal{L}_{fs}$), set to zero;

Jointly train (620) the depth network and the motion network with parameters of the optical flow network trained in step 615 fixed, and with hyper-parameters for the loss for the flow view synthesis ($\mathcal{L}_{fvs}$) and the loss for optical flow smoothness ($\mathcal{L}_{fs}$) set to zero; and Jointly train (625) the optical flow with parameters of the depth flow network trained in step 620 fixed, and with hyper-parameters for the loss for depth view synthesis ($\mathcal{L}_{dvs}$), the loss for depth smoothness ($\mathcal{L}_{ds}$), and the loss for 3D motion consistency between depths and flows ($\mathcal{L}_{dmc}$) set to zero. In one or more embodiments, step 620 and step 625 are repeated with a maximum number, e.g. 2, of loops and/or until the performance gain on the validation set is unnoticeable, e.g. below a gain threshold.

3. Embodiments of Using Stereo to Solve Motion Confusion

As discussed in the introduction part (Section A), the reconstruction of moving objects in monocular video may have projective confusion. For example, when a dynamic object is moving at the same speed as the camera and the background is estimated to be far, projective confusion may occur. This is because when the depth value is estimated large, the dynamic object will stay at the same place in the warped image, yielding small photometric errors during training. Obviously, the losses of motion or smoothness Eq. (11) does not solve this issue. Therefore, in one or more embodiments, stereo images (which are captured at the same time but from different viewpoints) were added into learning the depth network to avoid such confusion jointly with monocular videos. As shown in some experiments of this patent document, the framework trained with stereo pairs correctly figures out the depth of the moving object regions.

In one or more embodiments, a corresponding stereo image $I_c$ is additionally available for the target image $I_t$, and $I_c$ it treated as another source image, similar to $I_s$, but with known camera pose $T_{t-c}$. In this case, since there is no motion factor (stereo pairs are simultaneously captured), the same loss of $\mathcal{L}_s$ and $\mathcal{L}_{vs}$ taken $I_c$, $I_t$ as inputs is adopted for supervising the depth network. Formally, the total loss for DepthNet when having stereo images is:

$$\mathcal{L}_{mono\text{-}stereo} = \mathcal{L}_{mono} + \Sigma_l \{\lambda_{cvs} \mathcal{L}_{vs}^l(I_c) + \lambda_{cs} \mathcal{L}_s^l(I_c)\} \quad (12)$$

where $\mathcal{L}(I_c)$ and $\mathcal{L}_{bi\text{-}vs}(I_c)$ indicate the corresponding losses which are computed using stereo image $I_c$. Here, steps of learning depth and motion networks are updated in methodology 1 by adding the loss from stereo pair with $\lambda_{cvs}=4$ and $\lambda_{cs}=10$.

D. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, the datasets and evaluation metrics used in various experiments are described first, and comprehensive evaluation of EPC++ on different tasks are then presented.

1. Implementation Details Embodiments

In one or more embodiments, EPC++ comprises three sub-networks: DepthNet, FlowNet and MotionNet as described in Section C, although other depth, flow, and motion networks may be used. In one or more embodiments, the presented HMP module has no learnable parameters, thus does not increase the model size, and needs no hyper-parameter tuning.

DepthNet architecture embodiments. In one or more embodiments, a DispNet-like architecture is adopted for DepthNet. DispNet is based on an encoder-decoder design with skip connections and multi-scale side outputs. All cony layers are followed by ReLU activation except for the top output layer, where a sigmoid function is applied to constrain the depth prediction within a reasonable range. In practice, the disparity output range may be constrained within 0-0.3. Batch normalization (BN) is performed on all cony layers when training with stereo images, and is dropped when training with only monocular images for better stability and performance. This may be because BN helps to reduce the scale confusion between monocular and stereo images. In addition, for stereo training, the DepthNet outputs the disparity maps of both the left and the right images for computing their consistency. During training, the Adam optimizer is applied with $\beta_1=0.9$, $\beta_2=0.999$, learning rate of $2\times10^{-4}$ and batch size of 4. In training stage one, the hyper-parameters are set as $\lambda_{dvs}=1.0$, $\lambda_{ds}=2.5$ respectively.

FlowNet architecture embodiments. In one or more embodiments, a PWC-Net (Sun et al, "*PWC-Net: CNNs for optical flow using pyramid, warping, and cost volume*", arXiv 1709.02371, 2017) is adopted as FlowNet. PWC-Net is based on an encoder-decoder design with intermediate layers warping CNN features for reconstruction. During training stage one, the network is optimized with Adam optimizer with $\beta_1=0.9$, $\beta_2=0.999$, learning rate of $2\times10^{-4}$ for 100,000 iterations. The batch size is set as 4 and other hyper-parameters are set as in Wang et al. ("*Occlusion aware unsupervised learning of optical flow*," in CVPR, 2018).

MotionNet architecture. In one or more embodiments, the MotionNet architecture is the same as the Pose CNN (Zhou et al., "*Unsupervised learning of depth and ego-motion from video*", CVPR, 2017). 6-dimensional camera motion is estimated after 7 convolution layers. The learning optimizer is set to be the same as DepthNet.

2. Embodiments of Datasets and Metrics

Extensive experiments were conducted on five tasks to validate the effectiveness of EPC++ in different aspects. These tasks include: depth estimation, optical flow estimation, 3D scene flow estimation, odometry and moving object segmentation. All the results are evaluated on one or more datasets using the corresponding standard metrics commonly used by other SOTA methods.

Experiment Datasets. Various experiment datasets were used in this patent document to provide videos in various scenes captured by monocular or stereo cameras, sparse depth ground truths, and 2D flow and 3D scene flow ground truth. The moving object mask is provided as a binary map to distinguish between static background and moving foreground in flow evaluation. In one or more embodiments, during training, various stereo videos that exclude test and validation scenes are used. The monocular training sequences are constructed with three consecutive frames; left and right views are processed independently. Stereo training pairs are constructed with left and right frame pairs, resulting in multiple training samples. In one or more embodiments, the input size is set as 256×832 for details capturing.

In one or more embodiments, for depth evaluation, the Eigen split (by D. Eigen, et al., "*Depth map prediction from a single image using a multi-scale deep network*", in NIPS, 2014) is chosen for experiments to compare with more baseline methods. To evaluate at input image resolution, the depth predictions were rescaled by bilinear interpolation. In one or more embodiments, the sequence length is set to be 3 during training. For optical flow evaluation, performance are evaluated on both training and test splits of a first and a second experiment datasets and compared with other unsupervised methods. Both training and test sets contain 200 image pairs. Ground truth optical flow for training split is provided and the ground truth for test split is withheld on the evaluation server. Scene flow and segmentation evaluation were evaluated on the second dataset training split, which contains 200 image pairs. The scene flow ground truth is publicly available and the moving object ground truth is only provided for this split. The odometry is evaluated on test sequences. The visualization results on training sequences are also presented.

Metrics. The existing metrics of depth, optical flow, odometry, segmentation and scene flow were used for evaluation. For depth and odometry evaluation, the code from Zhou et al. ("*Unsupervised learning of depth and ego-motion from video*", CVPR, 2017) are adopted. For optical flow and scene flow evaluation, the official toolkit provided by Menze et al. ("*Object scene flow for autonomous vehicles*", CVPR, 2015) are used. For foreground segmentation evaluation, the overall/per-class pixel accuracy and mean/frequency weighted (f.w.) IOU for binary segmentation are used. The definition of each metric used in evaluation is specified in Table 1, in which, $x^*$ and $x^i$ are ground truth and estimated results ($x \in \{d,f,t\}$). $n_{ij}$ is the number of pixels of class i segmented into class j. $t_j$ is the total number of pixels in class h. $n_{cl}$ is the total number of classes.

depth performances: (1) ablation study of presented approach and (2) depth performance comparison with the SOTA methods.

Ablation study. The effectiveness of each component of EPC++ is explored. Several variant results are generated for evaluation, including:

(1) EPC++ (mono depth only): DepthNet trained with view synthesis and smoothness loss ($\mathcal{L}_{dvs} + \mathcal{L}_{ds}$) on monocular sequences, which is already better than many SOTA methods;

(2) EPC++ (mono depth consist): Fine-tune the trained DepthNet with a depth consistency term as formulated with $|D_s(p_{sf}) - \hat{D}_s(p_{st})|$ term, which is a part of Eq. (9); It is shown that it benefits the depth learning.

(3) EPC++ (mono flow consist): DepthNet trained by adding flow consistency in Eq. (9), where the visibility mask is dropped. It can be seen that the performance is worse than adding depth consistency alone since flow at non-visible parts harms the matching.

(4) EPC++ (mono vis flow consist): DepthNet trained with depth and flow consistency as in Eq. (9), but add the computation of visibility mask V; this further improves the results.

(5) EPC++ (mono): Final results from DepthNet with twice iterative depth-flow consistency training, yielding the best performance.

In one or more embodiments, the use of stereo training samples is also explored in the presented framework, and report performances of two variants are reported.

TABLE 1

Evaluation metrics for various tasks. From top row to bottom row: depth, optical flow, odometry, scene flow and segmentation.

Abs Rel: $\frac{1}{|D|} \sum_{d' \in D} |d^* - d'|/d^*$    Sq Rel: $\frac{1}{|D|} \sum_{d' \in D} \|d^* - d'\|^2 / d^*$ RMSE: $\sqrt{\frac{1}{|D|} \sum_{d' \in D} \|d^* - d'\|^2}$    RMSE log: $\sqrt{\frac{1}{|D|} \sum_{d' \in D} \|\log d^* - \log d'\|^2}$ $\delta_t$: % of $d \in D \max\left(\frac{d^*}{d}, \frac{d}{d^*}\right) < t$ EPE: $\frac{1}{|F|} \sqrt{\sum_{f' \in F} \|f^* - f'\|^2}$    Fl: err >3px and err >|f*| × 5%

ATE: $\frac{1}{|T|} \sqrt{\sum_{t' \in T} \|t^* - t'\|^2}$

D1, D2: $\frac{1}{|D|} \sum_{d' \in D} |d^* - d'|$    FL: $\frac{1}{|F|} \sum_{f' \in F} |f^* - f'|$ Pixel acc: $\frac{\sum_i n_{ii}}{\sum_i t_i}$    mean acc: $\frac{1}{n_{cl}} \sum_i \frac{n_{ii}}{t_i}$ Mean IoU: $\frac{1}{n_{cl}} \sum_i \frac{n_{ii}}{t_i + \sum_j n_{ji} - n_{ii}}$    f.w.IoU: $\frac{1}{\sum_i t_k} \sum_i \frac{t_i n_{ii}}{t_i + \sum_j n_{ji} - n_{ii}}$ 3. Embodiments of Depth Evaluation Experiment setup. The depth experiments are conducted to evaluate the performance of EPC++ and its variants. In one or more embodiments, only pixels with ground truth depth values (e.g. valid Lidar projected points) are evaluated. The following evaluations are performed to present the (6) EPC (stereo depth only): DepthNet trained on stereo pairs with only $\mathcal{L}_{dvs} + \mathcal{L}_{ds}$.

(7) EPC++ (stereo depth consist): DepthNet trained on stereo pairs with depth consistency.

(8) EPC++ (stereo): Presented full model trained with stereo samples.

It is notable that for monocular training, the left and right view frames are considered independently and thus the frameworks trained with either monocular or stereo samples leverage the same amount training data. The presented approach (EPC++) trained with both stereo and sequential samples have showed large performance boost over using only one type of training samples, proving the effectiveness of incorporating stereo into the training. With fine-tuning from HMP, comparing results of EPC++ (stereo) and EPC++ (stereo depth consist), the performance is further improved.

Comparison with state-of-the-art. Following the tradition of other methods, the same crop as in Eigen et al. ("*Depth map prediction from a single image using a multi-scale deep network*", NIPS, 2014) is applied during evaluation on Eigen split. A comprehensive comparison is conducted with various SOTA methods that take both monocular and stereo samples for training.

The presented approach outperforms current SOTA unsupervised methods on all metrics by a large margin. Applying the depth-flow consistency eliminates some "outlier" depth predictions. It can be seen that depth results using presented approaches in this patent document preserve the details of the scene noticeably better.

4. Embodiments of Optical Flow Evaluation

Experiment setup. The optical flow evaluation is performed on various datasets. For ablation study, the comparison of full model and other variants is evaluated on various training split with ground truth optical flow. Training split is chosen for ablation study as the ground truth of the test split is withheld.

Ablation study. The ablation study the presented model and 4 different variants, which include:

(1) Flow only: FlowNet trained with only view synthesis and smoothness losses $\mathcal{L}_{fvs}+\mathcal{L}_{fs}$.

(2) Fine-tuned with depth: FlowNet is fine-tuned jointly with DepthNet after individually trained using $\mathcal{L}_{dmc}+\mathcal{L}_{2d\text{-}mc}$. The results are worse than training with flow alone; this is because the flows from depth at rigid regions, i.e., $p_{st}$ in Eq. (9), are not as accurate as those from learning FlowNet alone. In other words, factorized depth and camera motion in the system may introduce extra noise to 2D optical flow estimation.

(3) EPC++ all region: DepthNet is fixed, but fine-tune FlowNet is fine-tuned without using the visibility mask V. The flows at rigid regions are even worse for the same reason as above, while the results at the occluded region become much better.

(4) EPC++ vis-rigid region: DepthNet is fixed, and FlowNet is fine-tuned at the pixels of the visible and rigid regions, where the effect of improving at occluded region is marginal.

(5) EPC++ non-vis region: FlowNew is only fine-tuned with $\mathcal{L}_{2d\text{-}mc}$ and it yields improved results at all the regions of optical flow.

Results from variants (1)-(5) validate assumption that the rigid flow from depth and camera motion helps the optical flow learning at the non-visible/occluded region. Two variants of the presented framework trained with stereo samples: EPC (stereo) vis-rigid region and EPC (stereo) non-vis region are also compared. Similar conclusion is drawn.

Comparison with SOTA methods. For fair comparison with current SOTA optical flow methods, the presented FlowNet have also been evaluated on various training and test splits. It should be noted that, compared to some SOTA method, the presented method only takes two frames as input to estimate the optical flow. EPC++ results at full regions are better in sharpness and smoothness of the optical flow.

5. Embodiments of Odometry Estimation

In one or more embodiments, to evaluate the performance of the trained MotionNet, odometry metrics is used. The same protocol as in Zhou et al. ("*Unsupervised learning of depth and ego-motion from video*", CVPR, 2017) is applied in the evaluation, which measures the absolute trajectory error averaged over every consecutive five frames. Unlike some previous works training a MotionNet using stacked five frames (as described in Section C), the MotionNet takes three frames as input and fine-tunes it on various dataset odometry split. This method is compared with several unsupervised SOTA methods on two sequences of experiment datasets. In one or more embodiments, to explore model variants, learning DepthNet with monocular samples (EPC++ (mono)) and with stereo pairs (EPC++ (stereo)) was experimented.

In one or more experiments, trained MotionNet presented in this patent document has shown superior performance with respect to visual SLAM methods (ORB-SLAM), and is comparable to other unsupervised learning methods with slight improvement on two test sequences. The more accurate depth estimation from the DepthNet in this patent document helps constraint the output of MotionNet, yielding better odometry results. Experiment results show that EPC++ are more robust to large motion changes and closer to the ground truth trajectories.

The small quantitative performance gap leads to large qualitative performance difference because the metric only evaluates 5-frame relative errors and always assumes the first frame prediction to be ground truth; thus the errors can add up in the sequence while the existing metrics do not take it into consideration. To better compare the odometry performance over the complete sequence, the evaluation metrics as proposed in Li et al. ("UnDeepVO: Monocular visual odometry through unsupervised deep learning", ICRA, 2018) are adopted. This metric evaluates the average translational and rotational errors over the full sequence.

6. Embodiments of Moving Object Segmentation

Ideally, the residual between the dynamic scene flow $M_d$ and the background scene flow $M_b$ represents the motion of foreground object. As the HMP (Eq. (4)) is capable of decomposing the foreground and background motion by leveraging the depth-flow consistency, the effectiveness of this decomposition was tested by evaluating the foreground object segmentation.

Experiment setup. The moving object segmentation is evaluated on training split of a test dataset. An "Object map" is provided in this dataset to distinguish the foreground and background in flow evaluation. In one or more embodiments, this motion mask is used as ground truth in segmentation evaluation. In one or more embodiments, the foreground segmentation estimation is generated by subtracting the rigid optical flow from optical flow, as indicated by S in Eq. (4). In one or more embodiments, a threshold on $M_d/D_t=3$ is set to generate a binary segmentation mask.

Evaluation results. Results using the presented method are compared with two previous methods that take the non-rigid scene into consideration. Yang et al. ("*Every pixel counts: Unsupervised geometry learning with holistic 3D motion understanding*", arXiv:1806.10556, 2018) explicitly models the moving object mask, and thus is directly comparable. The "explainability mask" (Zhou et al., "*Unsupervised learning of depth and Ego-Motion from video*", in CVPR, 2017) is designed to deal with both moving objects and occlusion, and here their performances were listed for a more comprehensive comparison. The generated foreground segmentation performs comparable to the previous methods on all metrics, and the visualization shows the motion mask aligns well with the moving object. On the metrics of "pixel acc." and "f.w. IoU", EPC++ trained with monocular sequences performs better than that trained with stereo pairs. One possible reason is that the network trained with monocular samples is more prone to predicting large segmentation regions to cover the matching errors (e.g., errors caused by the depth confusion) and hence performs better on a metric that focuses on the "recall" number ("pixel acc" and "f.w. IoU").

7. Embodiments of Scene Flow Evaluation

Experiment setup. The scene flow evaluation is performed on training split of a test dataset. There are 200 frames pairs (frames for t and t+1) in the scene flow training split. The depth ground truth of the two consecutive frames and the 2D optical flow ground truth from frame t to frame t+1 are provided. The evaluation of scene flow is performed with various datasets generates depth/disparity without absolute scale, the estimated depth is rescaled by matching the median to ground truth depth for each image. Since no unsupervised methods have reported scene flow performances on an experiment dataset, the presented model trained on monocular sequences (EPC++ (mono)) and stereo pairs (EPC++ (stereo)) are only compared with the previous results reported in Yang et al. In the evaluation of scene flow, EPC++ scene flow performance outperforms the previous SOTA method by Yang et al.

E. Some Conclusions

In this patent document, embodiments of an unsupervised learning framework are presented for jointly predicting depth, optical flow and moving object segmentation masks. Specifically, in one or more embodiments, the geometrical relationship between all these tasks is formulated, where every pixel is explained by either rigid motion, non-rigid/object motion, or occluded/non-visible regions. In one or more embodiments, a holistic motion parser (HMP) is used to parse pixels in an image to different regions, and various losses were designed to encourage the depth, camera motion, and optical flow consistency. Finally, embodiments of an iterative learning pipeline are presented to effectively train all the models. Comprehensive experiments were conducted using various embodiments to evaluate their performance. On various experiment datasets, embodiments of the presented approach achieves state-of-the-art (SOTA) performance on all the tasks of depth estimation, optical flow estimation, and 2D moving object segmentation. The presented framework embodiments may be extended to other motion video data sets containing deformable and articulated non-rigid objects, and thus yielding a more comprehensive understanding of the videos. It shall be noted that jointly learning geometry and motion with three-dimensional holistic understanding has numerous technical applications, including robotic, autonomous vehicles, image processing, computer vision, etc., and can improve the performance of numerous applications in each of those areas.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
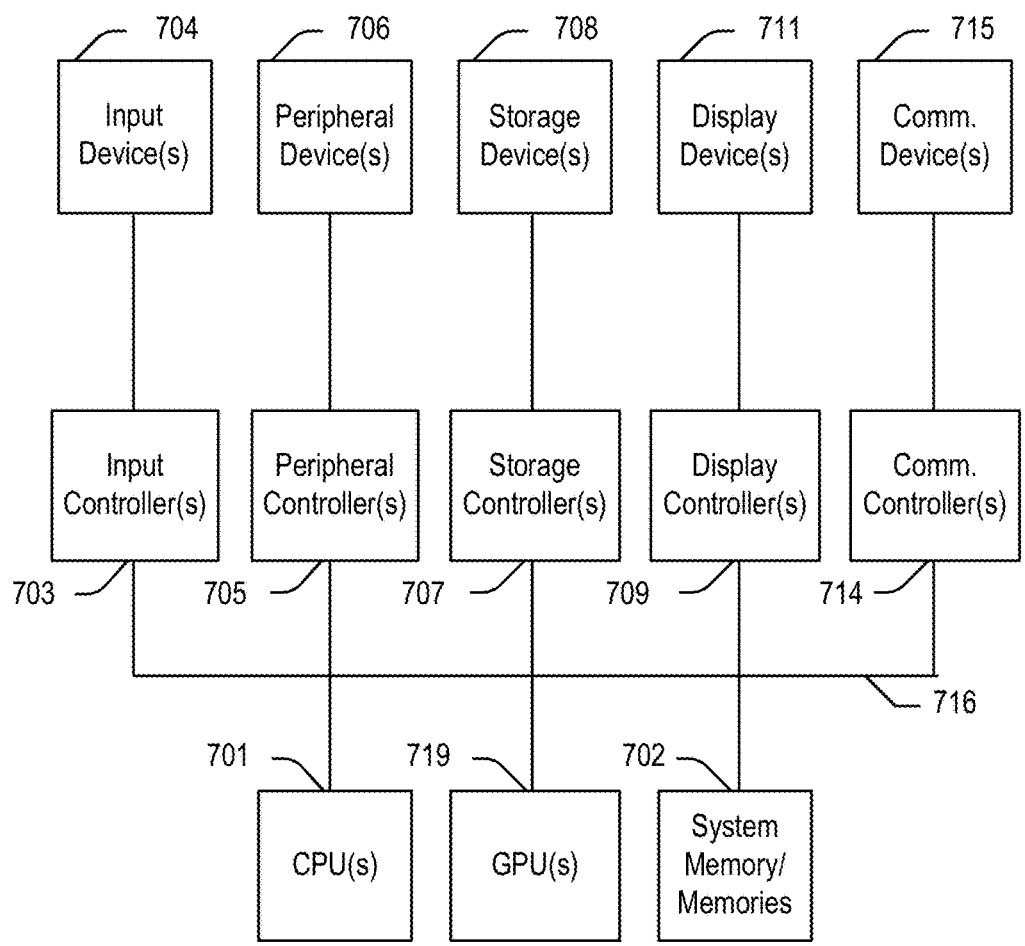
FIG. 7 depicts a simplified block diagram of a computing device/information handling system, in accordance with embodiments of the present document.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training an image processing model for estimating three-dimensional (3D) motion and geometry, the method comprising:
   receiving a pair of images comprising a first image and a second image different from the first image, the pair of images captured by a camera;
   predicting, using an optical flow network, one or more optical flows between the first and the second images;
   predicting, using a motion network, a relative camera pose of the camera based on the first and the second images;
   predicting, using a depth network, a first depth map and a second depth map corresponding to the first image and the second image, respectively; and
   fusing, using a holistic three-dimensional motion parser (HMP), the one or more optical flows, the relative camera pose, and the predicted depth maps for producing 3D motions for pixels in rigid background and pixels in one or more dynamic objects in the images, the holistic motion parser attributes 2D pixel motions to movements of 3D points by jointly considering the one or more optical flows and the predicted depth maps, the movements of the 3D points are decomposed with respect to camera motion and object motion for 3D motion understanding and estimation;
   wherein the optical flow network, the motion network, the depth network, and the HMP are trained individually or jointly using one or more losses associated with at least one of motion consistency, synthesis, and smoothness.

2. The computer-implemented method of claim 1 wherein one or more optical flows comprises a forward optical flow from the first image to the second image, and a backward optical flow from the second image to the first image.

3. The computer-implemented method of claim 2 wherein 3D motion for a pixel in rigid background within the first image is produced by the HMP with steps comprising:
   back projecting, with a back-projection function, the pixel in the first depth map from 2D to 3D space;
   obtaining a product between the back-projected pixel in 3D space and the relative camera pose; and
   identifying a difference between the obtained product and the projected 3D space as the 3D motion for the pixel in rigid background.

4. The computer-implemented method of claim 3 wherein the 3D motion for a pixel in the one or more dynamic objects within the first image is produced by the HMP with steps comprising:
identifying a corresponding pixel in the second image using the forward optical flow;
back projecting the corresponding pixel in the second depth map from 2D space to 3D space using the back-projection function;
subtracting the back-projected pixel in the first depth map in 3D space and the 3D motion for the pixel in rigid background from the back-projected corresponding pixel in the second depth map in 3D space to obtain a second difference; and
identifying a product between the second difference and a visibility mask as the 3D motion for the pixel in the one or more dynamic objects.

5. The computer-implemented method of claim 1 wherein the one or more losses for training the optical flow network, the motion network, the depth network, and the HMP comprise a weight combination of a loss for flow view synthesis ($\mathcal{L}_{dvs}$), a loss for optical flow view synthesis ($\mathcal{L}_{fvs}$), a loss for depth smoothness ($\mathcal{L}_{ds}$), a loss for optical flow smoothness ($\mathcal{L}_{fs}$), a loss for 3D motion consistency between depths and flows s ($\mathcal{L}_{dmc}$), and a loss for 2D motion consistency between depths and flows ($\mathcal{L}_{2D-mc}$), the weighted combination has a set of hyper parameters ($\lambda_{dvs}$, $\lambda_{fvs}$, $\lambda_{ds}$, $\lambda_{fs}$, $\lambda_{dmc}$, and $\lambda_{2D-mc}$) corresponding to the losses in the combination respectively for balance.

6. The computer-implemented method of claim 5 wherein 3D motion consistency between depths and flows is decomposed into 2D flow consistency and depth consistency to obtain the loss for 3D motion consistency.

7. The computer-implemented method of claim 6 wherein the 2D flow consistency is the difference between the corresponding pixel in the second image and the matching pixel in the second image, the depth consistency is the difference between the corresponding pixel in the second depth map and the matching pixel in the projected second depth map.

8. The computer-implemented method of claim 7 wherein the loss for 2D motion consistency is obtained using the 2D flow consistency and a visibility mask produced by the HMP, the visibility mask is set as 1 when the pixel in the first image is also visible in the second image, or set as 0 when the pixel in the first image is occluded in the second image or out of the second image.

9. The computer-implemented method of claim 5 wherein the set of hyper-parameters is adjusted in a stage-wise learning procedure comprising steps of:
i) training the depth network and the motion network individually with hyper-parameters for all losses in the combination except the loss for flow view synthesis ($\mathcal{L}_{dvs}$) and the loss for depth smoothness ($\mathcal{L}_{ds}$), set to zero;
ii) training the optical flow network with hyper-parameters for all losses in the combination except the loss for optical flow view synthesis ($\mathcal{L}_{fvs}$) and the loss for optical flow smoothness ($\mathcal{L}_{fs}$), set to zero;
iii) jointly training the depth network and the motion network with parameters of the optical flow network trained in step ii) fixed, and with hyper-parameters for the loss for the flow view synthesis ($\mathcal{L}_{fvs}$) and the loss for optical flow smoothness ($\mathcal{L}_{fs}$) set to zero;
iv) jointly training the optical flow with parameters of the depth flow network trained in step iii) fixed, and with hyper-parameters for the loss for depth view synthesis ($\mathcal{L}_{dvs}$), the loss for depth smoothness ($\mathcal{L}_{ds}$), and the loss for 3D motion consistency between depths and flows ($\mathcal{L}_{dmc}$) set to zero; and
v) repeating step iii) and iv) until a performance gain on validation data set is below a threshold.

10. A computer-implemented method for estimating three-dimensional (3D) motion and geometry, the method comprising:
receiving, from a camera, at least a first image and a second image different from the first image;
predicting, by an optical flow network, a forward optical flow from the first image to the second image;
predicting, by a motion network, a relative camera pose of the camera from the first image to the second image;
predicting, by a depth network, a first depth map and a second depth map corresponding to the first image and the second image respectively; and
fusing, using a holistic three-dimensional motion parser (HMP), the one or more optical flows, the relative camera pose, and the predicted depth maps for producing 3D motions for pixels in rigid background and pixels in one or more dynamic objects at visible regions, the rigid background and the one or more dynamic objects are separated by a moving object mask produced by the HMP.

11. The computer-implemented method of claim 10 wherein 3D motion for a pixel in rigid background within the first image is produced by the HMP with steps comprising:
projecting, using a back-projection function, the pixel in the first depth map from 2D to 3D space;
obtaining a product between the projected 3D space of the pixel in the first depth map and the relative camera pose; and
identifying a difference between the obtained product and the projected 3D space of the pixel in the first depth map as the 3D motion for the pixel in rigid background.

12. The computer-implemented method of claim 11 wherein the back-projection function is based on a camera intrinsic matrix and a homogenous coordinate of the pixel.

13. The computer-implemented method of claim 11 wherein 3D motion for a pixel in the one or more dynamic objects within the first image is produced by the HMP with steps comprising:
identifying a corresponding pixel in the second image using the forward optical flow;
back projecting the corresponding pixel in the second depth map from 2D space to 3D space using the back-projection function;
subtracting the back-projected 3D space of the corresponding pixel in the first depth map and the 3D motion for the pixel in rigid background from the back-projected corresponding pixel in the second depth map in 3D space to obtain a second difference; and
identifying a product between the second difference and a visibility mask as the 3D motion for the pixel in the one or more dynamic objects.

14. The computer-implemented method of claim 13 wherein the visibility mask is produced by the HMP, and a pixel location in the mask is set as unmasked when the pixel in the first image is also visible in the second image or set as masked when the pixel in the first image is occluded in the second image or out of the second image.

15. A system for image processing, the system comprising:
one or more processors; and
a non-transitory computer-readable medium or media, communicatively coupled to at least one of the one or more process, comprising:
an optical flow network to predict a forward optical flow from a first image to a second image of a scene;
a motion network to predict a relative camera pose of the camera based on the first image and the second image;
a depth network to estimate a first depth map and a second depth map for the first image and the second image, respectively; and
a holistic three-dimensional motion parser (HMP) to fuse the optical flow, the relative camera pose, and the first and second depth maps to produce at least three-dimensional (3D) motion maps for rigid background, 3D motion maps for one or more dynamic objects in the first or the second images, and a moving object mask to separate the rigid background and the one or more dynamic objects.

16. The system of claim 15 wherein 3D motion for a pixel in a rigid background within the first image is produced by the HMP with steps comprising:
projecting, using a back-projection function, the pixel in the first depth map from 2D to 3D space;
obtaining a product between the projected 3D space of the pixel in the first depth map and the relative camera pose; and
identifying a difference between the obtained product and the projected 3D space of the pixel in the first depth map as the 3D motion for the pixel in rigid background.

17. The system of claim 16 wherein the back-projection function is based on a camera intrinsic matrix and a homogenous coordinate of the pixel.

18. The system of claim 16 wherein 3D motion for a pixel in the one or more dynamic objects within the first image is produced by the HMP with steps comprising:
identifying a corresponding pixel in the second image using the forward optical flow;
back projecting the corresponding pixel in the second depth map from 2D space to 3D space using the back-projection function;
subtracting the back-projected 3D space of the corresponding pixel in the first depth map and the 3D motion for the pixel in rigid background from the back-projected corresponding pixel in the second depth map in 3D space to obtain a second difference; and
identifying a product between the second difference and a visibility mask as the 3D motion for the pixel in the one or more dynamic objects.

19. The system of claim 18 wherein the visibility mask is produced by the HMP, and a pixel location in the mask is set as unmasked when the pixel in the first image is also visible in the second image or set as masked when the pixel in the first image is occluded in the second image or out of the second image.

* * * * *